US009838677B1

(12) United States Patent
Ramaswamy

(10) Patent No.: US 9,838,677 B1
(45) Date of Patent: Dec. 5, 2017

(54) DETECTING IMPACT EVENTS FOR DROPPED DEVICES

(71) Applicant: Amazon Technologies, Inc., Reno, NV (US)

(72) Inventor: Sharadh Ramaswamy, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1197 days.

(21) Appl. No.: 13/929,622

(22) Filed: Jun. 27, 2013

(51) Int. Cl.
H04N 17/00 (2006.01)

(52) U.S. Cl.
CPC .................................. H04N 17/00 (2013.01)

(58) Field of Classification Search
CPC ................ G06T 7/002; H04N 13/0239; H04N 13/0242; H04N 2213/001
USPC ............................................................ 348/48
See application file for complete search history.

(56) References Cited

U.S. PATENT DOCUMENTS

| | | | | |
|---|---|---|---|---|
| 8,754,929 B1* | 6/2014 | Prince | ................ | H04N 13/0022 348/47 |
| 8,878,909 B1* | 11/2014 | Prince | ...................... | G06T 7/55 348/47 |
| 9,392,165 B2* | 7/2016 | Choi | ..................... | H04N 5/2258 |
| 2006/0197538 A1* | 9/2006 | Leinonen | ............... | H01Q 1/243 324/533 |
| 2007/0126334 A1* | 6/2007 | Nakamura | ............ | H01J 9/2271 313/484 |
| 2010/0310182 A1* | 12/2010 | Kroepfl | .............. | G06K 9/00624 382/216 |
| 2010/0328230 A1* | 12/2010 | Faubert | ................. | G06F 1/1626 345/173 |
| 2013/0016186 A1* | 1/2013 | Atanassov | ......... | H04N 13/0246 348/47 |
| 2013/0063572 A1* | 3/2013 | Ramachandra | .... | H04N 13/0018 348/47 |

* cited by examiner

Primary Examiner — Jessica M Prince
(74) Attorney, Agent, or Firm — Polsinelli LLP

(57) ABSTRACT

Embodiments enable detecting an occurrence such as an impact event, which can occur when an electronic device impacts a surface or object (e.g., from a fall), which may have occurred while the device was powered off, in a low power mode, or other state where the device cannot detect such an impact using an accelerometer or other such sensor. Various calibration processes can be used to determine an amount of misalignment between two or more cameras of the device, where an amount of misalignment more than an allowable threshold can be indicative of the impact event, at which point one or more system checks can be performed to determine whether the device components (e.g., memory, hard-disk, drives, antennas, etc.) or certain portions or components of the device are operating properly.

17 Claims, 6 Drawing Sheets

DETECTING IMPACT EVENTS FOR DROPPED DEVICES

BACKGROUND

Computers and other electronic devices have become ubiquitous and often indispensable to our work and personal life as people increasingly interact with these devices in new and interesting ways. One convenience of such devices is that they are often small and light, and are easy to hold in a hand or carry in a purse or pocket, or are otherwise easily transportable. While the size and weight of these devices make them convenient to carry around, these characteristics often make the devices more susceptible to damage. For example, such devices can be damaged due to impact with a surface such as when the device is dropped, where the impact due to the drop may have dislodged or otherwise damaged one or more components of the device. In some situations, the device may be powered off when such a drop occurs, and the user may, upon powering the device on, continue to use the device unaware of the damage caused due to the impact when drop. In some situations, the continued use of the device after impact may cause additional damage to the device as the user attempts to use components damaged by the impact.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to damage prevention and/or damage notification for an electronic device. In particular, various embodiments enable detecting an occurrence such as an impact event, which can occur when an electronic device impacts a surface or object (e.g., from a fall), which may have occurred while the device was powered off, in a low power mode, or other state where the device cannot detect such an impact using an accelerometer or other such sensor. Approaches in accordance with various embodiments enable the use of various calibration processes to determine an amount of misalignment between two or more cameras of the device, where an amount of misalignment more than an allowable threshold can be indicative of an impact event, at which point one or more system checks can be performed to determine whether the device components or certain portions or components of the device are operating properly. Further, a notification of such damage can be provided to a user so that the user can address the damage. Various other applications, processes, and uses are presented below with respect to the various embodiments.

Figure 1:
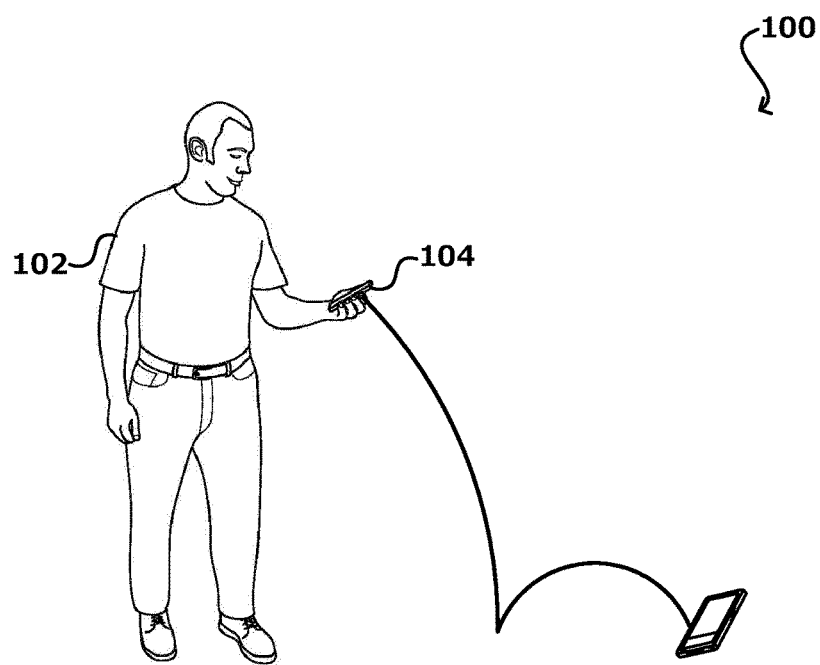
FIG. 1 illustrates an example situation illustrating an impact event.

As described, electronic devices (e.g., mobile phones, tablet computers, wearable computers such as glasses and watches, etc.) can be easily dropped or pushed from a surface due to their small size and the variety of places and situations where such devices can be carried and/or used. As shown in example 100 of FIG. 1, a user 102 operating an electronic device 104 may lose control and drop the device from their hand. Although the device is dropped from the user's hand, in various other situations, the device can be dropped from the user's pocket, bag, carrying case, holster, etc. In any situation, there is chance of damaging the device due to the drop, e.g., some sensors or other components of the device may stop working. Conventionally, when a device is powered on, an accelerometer, gyroscope, camera, or other device component capable of determining movement and/or the position of the device can be used to detect when the device is dropped. However, in some situations, the device may be powered off when dropped, where such components are not available.

Accordingly, in accordance with various embodiments, approaches enable the use of various calibration processes to determine an amount of misalignment between two or more cameras of the device, where an amount of misalignment greater than an allowable threshold can be indicative of an impact event that may have occurred when the device was powered off, in a low power state, or otherwise not able to detect such an impact. As described, two or more cameras (e.g., a stereoscopic pair of cameras) of a computing device with optical axis aligned or substantially parallel can be caused to be misaligned due to impact with a surface (e.g., due to a drop). Accordingly, the amount of misalignment can be compared to a threshold, where an amount of misalignment meeting or exceeding the threshold can be indicative of an impact event (such as dropping the device). In the situation where the amount of misalignment at least meets the threshold, the amount of misalignment can be compared to a previous determined amount of misalignment (e.g., an amount of misalignment determined before the device was powered off), where a difference in misalignment of more than a threshold amount is indicative of an impact event. Thereafter, one or more checks of memory, hard-disk, drives, antennas, among other device components can be performed.

In accordance with various embodiments, a number of approaches can be implemented to detect an amount of misalignment between pairs of cameras. As mentioned, disparity information can be used to determine whether at least one pair of stereo cameras is misaligned. For example, many electronic and computing devices offer stereoscopic or three-dimensional (3D) imaging using at least one pair of high resolution matched cameras. When capturing a stereoscopic image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process. As described further herein, disparity information can also be used to determine whether stereo cameras are misaligned.

Figure 2:
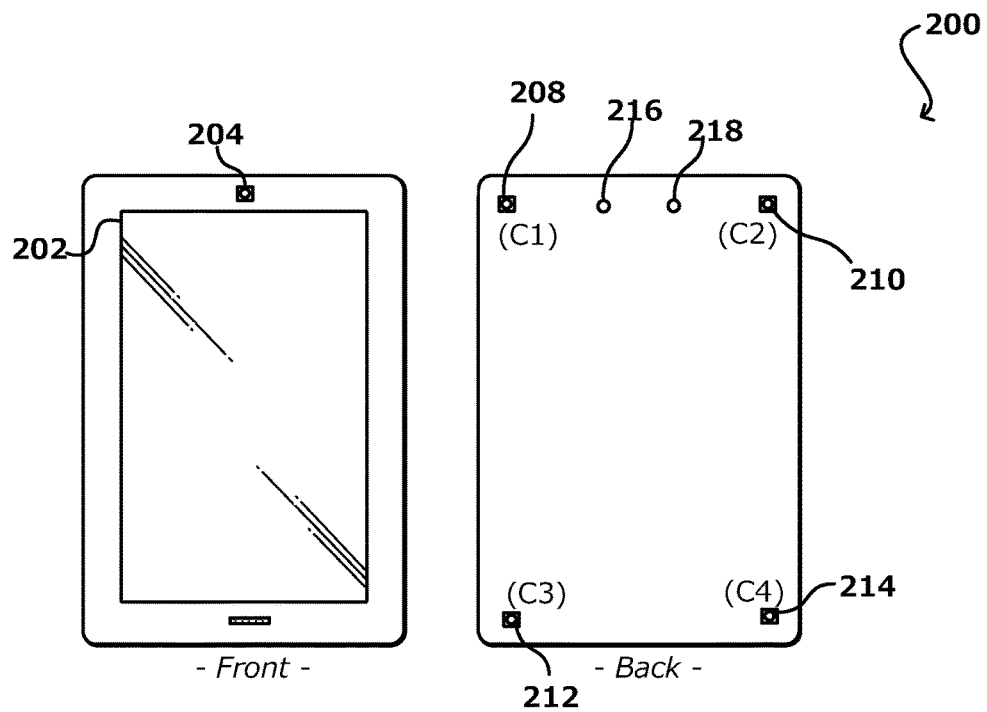
FIG. 2 illustrates front and back views of an example computing device including a multiple cameras capable of providing 3D imaging in accordance with various embodiments.

FIG. 2 illustrates front and back views of an example electronic device 200 that can be utilized in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, portable media players, wearable computers (e.g., smart watches or glasses), among others. The electronic device can utilize some of the same elements as a conventional device, such as may include a display screen 202 and at least one front-facing camera 204.

This example also includes four cameras 208, 210, 212, 214 arranged to provide at least two stereoscopic imaging pairs. These cameras are labeled C1, C2, C3, and C4 for reference, as used later herein. While shown on the backside of the device in this example, it should be understood that the pairs could be on the front of the device or in one or more other appropriate locations, such as on the sides, corners, edges, etc. of the device. Further, while two pairs of stereoscopic cameras are illustrated, it should be understood that there can be additional pairs of cameras utilized as well as discussed elsewhere herein. The example device can include other elements useful for imaging as well, such as a light sensor 216 for determining an amount of ambient light and a white light LED 218, or other such illumination element, useful in illuminating objects within at least a portion of a field of view of at least one of the cameras 208, 210, 212, 214. Each image capture element may be, for example, a camera, a complimentary metal-oxide semiconductor (CMOS) device, or another appropriate image capturing element or sensor. It should be understood that while certain elements are shown to be included on a "front" or "back" side of the device that any or all of these elements can be positioned on various sides, edges, faces, or other regions of such a device. Further, terms such as "front," "back," and "top" are used for purposes of explanation and are not intended to be interpreted as required orientations unless otherwise stated. Further still, while terms such as "rectangular grid" or "rectangular pattern" are used herein to describe the relative arrangements of various cameras, it should be understood that pairs of cameras in such a system are positioned along orthogonal axes, such as horizontal and vertical axes, such that a camera of a pair is positioned horizontally or vertically (or along other orthogonal axes) with respect to another camera of the pair. It should be noted that the cameras do not have to form a proper rectangle, but can form other patterns such as a cross, set of parallel lines, points along a rectilinear grid, etc. Various other geometries and arrangements can be used as well within the scope of the various embodiments.

For any pair of these cameras that have at least a partially overlapping field of view, three-dimensional imaging can be performed by capturing image information for one or more objects from two different perspectives or points of view, and combining the information to produce a 3D image. In at least some embodiments, the fields of view can initially be matched through careful placement and calibration, such as by imaging a known calibration standards and adjusting an optical axis of one or more cameras to have those axes be substantially parallel. However, as mentioned, cameras can become misaligned due to factors such as impact or shock to the device, such as when the device is dropped and impacts a surface. Accordingly, misalignment information can be used to determine whether the device was dropped while the device was powered off. For example, if it is determined that the cameras are misaligned upon powering on the device, and the cameras are determined to be aligned before powering off the device, it can be assumed that such misalignment was due to an impact event while the device was powered off. Similarly, if the difference between a first misalignment amount before the device was powered off and a second misalignment amount determined after the device is power on meets a threshold difference, then it can be assumed that such misalignment was due to an impact event while the device was powered off.

Figure 3A:
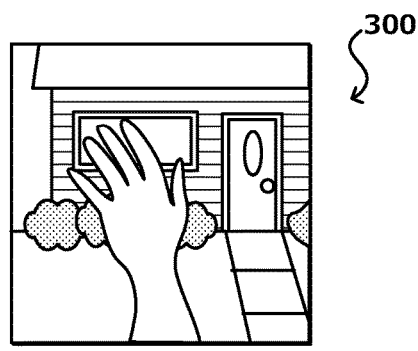
FIGS. 3(a), 3(b), 3(c), and 3(d) illustrate examples of images that can be used and/or generated using stereoscopic cameras to determine an amount of misalignment in accordance with various embodiments.
Figure 3B:
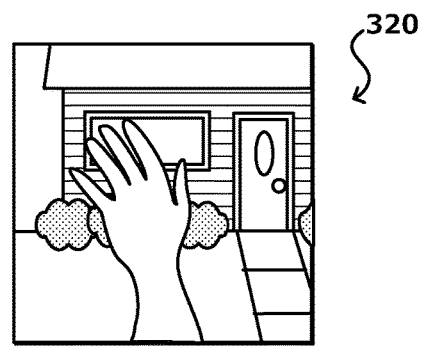
Figure 3C:
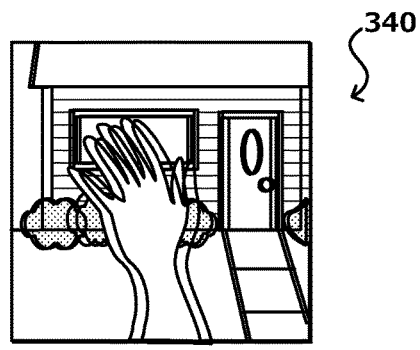
Figure 3D:
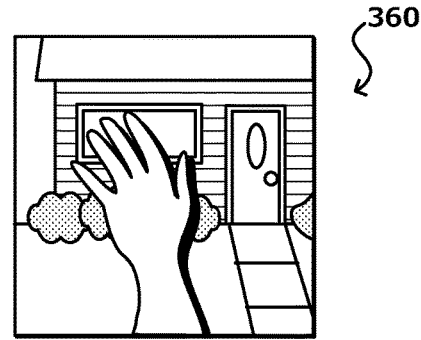

As mentioned, the amount of misalignment can be determined based on an amount of offset or disparity between an object identified in images captured by a pair of cameras. Such an offset is described in regard to FIG. 3(a), FIG. 3(b), FIG. 3(c), and FIG. 3(d). FIG. 3(a) illustrates what will be referred to herein as a "left" image 300 and FIG. 3(b) illustrates what will be referred to herein as a "right" image 320, although other orientations can be used as well in other situations and embodiments. These images are each captured by one of a pair of cameras that are offset from each other along a horizontal axis, such that one camera is offset to the left and one offset to the right in this orientation. As discussed elsewhere herein, pairs of cameras can be offset in up and down directions, among other such options. Since each image is captured using a camera at a slightly different location, the position of objects in each image will be different. As an example, if one were to overlay one of these images 300 on top of the other 320, as illustrated in the example image 340 of FIG. 3(c), it can be seen that each of the objects is slightly offset, with objects closer to the camera being more offset than others, due to disparity differences as discussed previously. When displayed and/or viewed as a three dimensional image, however, the disparity causes the objects in the image to appear to be located at different depths, as illustrated in the image 360 of FIG. 3(d), resulting from the disparity between the two images.

In order for the images to combine to form an accurate three-dimensional image, the cameras used to capture the component images should be sufficiently aligned and/or rectified to represent the correct amount of disparity. Misalignments along the direction of the offset can cause objects to have an incorrect amount of disparity, which can affect the apparent depth or distance to the object. It is almost always the case, however, that misalignments due to impact events will have components in directions other than the direction of the offset. Misalignments in in these directions can cause various potential problems, such as problems with processing computer vision algorithms, problems with objects being blurry or otherwise improperly rendered when the component images are combined for the three-dimensional image, etc. For perfectly aligned cameras, such as cameras with perfectly aligned optical axes, the locations of objects imaged by the cameras will appear on the same scan line, but with an offset along the scan line (generally) due to the offset. For example, and as described, stereo imaging applications involve the generation and analysis of at least two images of an object from different points of view. Typically, the two images correspond to left and right images generated by cameras positioned along, and orthogonal to, at least two viewpoints on a horizontal axis. Collectively, the left and right images are called a stereo image pair. The left and right images of a stereo image pair may be analyzed to yield disparity data. Disparity is the amount of translation along a conceptual epipolar axis that all objects move along in response to changing the image creation viewpoint. If the cameras are perfectly aligned, both vertically and rotationally, the epipolar axis is identical to the horizontal axis. That is, the corresponding epipolar lines coincide and become parallel to the x-axis of the image. Misalignments in directions other than the offset direction are relatively easy to detect by comparing the location of various object points or features to determine whether those features are on different scan lines. Any change in the offset in a direction other than the camera offset can be indicative of an impact event or other occurrence which caused misalignment of the cameras, and thus could have caused other damage to the device.

For small errors, misalignments of any or all the cameras can be treated as linear translations in the images. Accordingly, a set of linear equations can be used to solve for the misalignments of each camera, as determined by the coordinates of the located feature points. In other embodiments, a set of homographies can be determined for the cameras using the coordinates of the feature points. By iterating over the homographies until a cost function converges, a misalignment amount can be determined, and the misalignment amount of the cameras can be solved together. Other approaches can be used as well, such as to attempt to directly solve for yaw, pitch, and roll errors.

Once a misalignment value is obtained, the misalignment value(s) (or related values) can be used to determine whether an impact event likely occurred. For example, a first amount of misalignment can be determined before the device is powered off. The first amount of misalignment can be determined at a number of different times. For example, the first amount of misalignment can be determined when an image (e.g., a stereoscopic image) is captured, when the device resumes from a low power or powered off state, at the expiration of a predetermined interval of time, when a particular application is used, etc. Determining the first amount of misalignment can be automatic (e.g., without user involvement) or performed manually (e.g., with user involvement). When the first amount of misalignment is automatically determined, the computing device determines information used in determining an amount of misalignment without prompting a user to take steps to acquire such information (e.g., images). When determining the first amount misalignment manually, a prompt can be provided to a user to perform one or more steps to acquire information used in determining the first amount of misalignment. For example, the user can be prompted to capture an image of an object such as one or more calibration objects, or other objects. Thereafter, the first amount of misalignment can be stored in memory.

When the device is powered on, resumes from a standby mode or inactive state, or otherwise transitions from a state where the computing device was not able to detect such an impact, a second amount of misalignment can be determined. As described, determining an amount of misalignment can be performed automatically or manually. The second amount of misalignment can be compared to the first amount of misalignment, and if the difference between the first and second amounts of misalignment are different by more than an allowable amount, such as a misalignment threshold, then it can be determined that the device has likely been dropped or otherwise impacted a surface and/or object. Thereafter, one or more system checks or other such processes can be performed on the device, such as to check the status of memory checks, hard-disk checks, antennas checks, etc.

In accordance with various embodiments, misalignment between cameras can be determined by comparing an amount of offset of interest points along a particular axis. As described, to determine whether a device was dropped when powered off, an amount of misalignment determined before the device was powered off is compared to an amount of misalignment determined when the device is powered on. Accordingly, approaches in accordance with various embodiments can utilize images captured of random (or other) objects before the device was powered off and after the device was powered on to attempt to determine an amount of misalignment between a stereo camera pair. As described, determining an amount of misalignment can be performed at any appropriate time, such as at regular intervals, at random times, or in response to detected events, such as rapid movements or force as detected by a motion sensor or other component of the device, the device powering on, restarting, etc. Where there are multiple pairs of stereo cameras on a device, different combinations of the cameras can be used to determine an amount of misalignment.

Figure 4A:
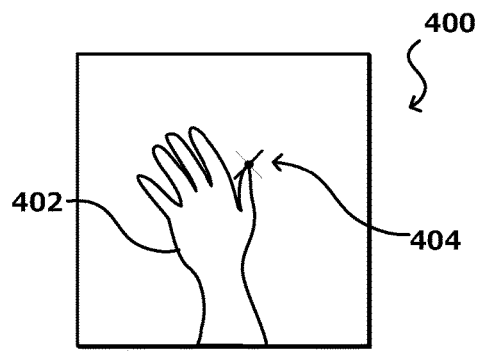
FIGS. 4(a), 4(b), 4(c), and 4(d) illustrate examples of locating feature points in an image and determining misalignment errors that can be utilized in accordance with various embodiments.

In one example, images can be simultaneously and/or concurrently captured by at least one pair of the cameras. Feature points, image points, or other such features of each image can be determined using one or more feature detection algorithms, as may recognize unique features or shapes, among other such features, that can be recognized in each image. As an example, FIG. 4(a) illustrates an image 400 including a view of a hand 402 of a person. If this image is fed to a feature point recognition algorithm, or other such process, a unique feature point such the tip 404 of the user's thumb can be located in each image. As known for such purposes, the feature can be located due to the presence of a transition point, recognized pattern, abrupt change in color or intensity, or other such aspect of the image at that location. Once a particular feature point is located in each of the images, the relative position of that point in the images can be analyzed.

Figure 4B:
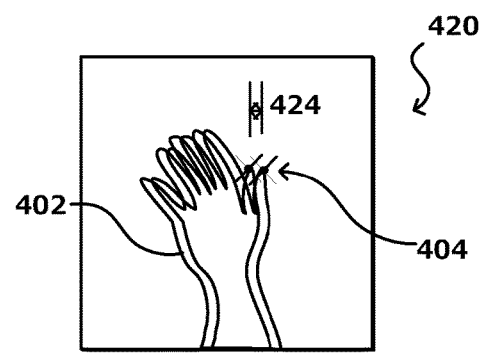

As an example, consider the image 420 represented in FIG. 4(b), which represents an overlay of images captured by a pair of stereo cameras offset horizontally, such as cameras C1 and C2 in FIG. 2. As can be seen, there is an expected amount of offset or disparity 424 due to the separation of the cameras along the horizontal axis (or x-axis). If the cameras are properly aligned, however, there will be no appreciable offset along the vertical axis (or y-axis). When properly rendered or viewed, the component parts of FIG. 4(b) then can provide a proper three-dimensional image.

Figure 4C:
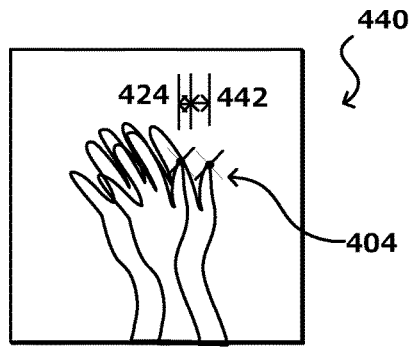
Figure 4D:
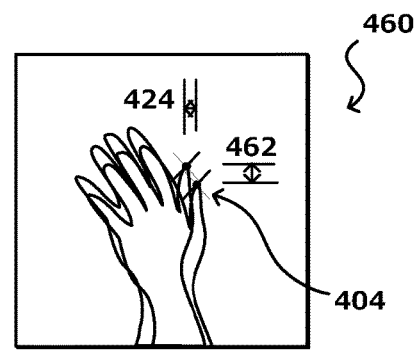

It may be the case, however, that there is some amount of misalignment of at least one of those cameras. For example, FIG. 4(c) illustrates an overlay 440 of images from the horizontally offset cameras as in FIG. 4(b). In this example, however, there is additional offset 442 along the x-axis, which can affect the apparent distance to that object in the three-dimensional image. This movement along the x-axis can be thought of as rotation along the y-axis, or "yaw" as it is often referred. Similarly, FIG. 4(d) illustrates an overlay 460 of images from the horizontally offset cameras as in FIG. 4(b), where there is an offset 442 along the y-axis, due to misalignment of at least one of the cameras. This offset along the y-axis can be attributed to rotation along the x-axis, or "pitch." As previously stated, for horizontally offset cameras such as cameras C1 and C2, there should be no appreciable offset along the y-axis.

In accordance with various embodiments, the fact that cameras such as C1, C2, C3, and C4 in FIG. 2 are aligned such that for any given pair of the cameras with a horizontal or vertical offset, either the x-coordinates or y-coordinates of the feature points in images captured by those cameras should be the same, depending on the orientation (as discussed with respect to FIG. 4(d)). For example, in FIG. 2 feature points in an image captured by C1 should have the same y-coordinates as the corresponding feature points in an image captured by C2, and the same goes for images capture by C3 with respect to C4. Similarly, feature points in an image captured by C1 should have the same x-coordinates as the corresponding feature points in an image captured by C3, and the same goes for images capture by C2 with respect to C4. Accordingly, an amount of misalignment indicative of an impact event can be determined by analyzing the translation of feature points along the x-axis and y-axis between the images.

For example, feature points can be determined for a first image and a second image of a pair of stereoscopic cameras (such as C1 and C2 of FIG. 2). When the pair of cameras is aligned for stereoscopic imaging, feature points in one image have a corresponding point on an epipolar line in the other image. In this way, when the epipolar geometry is not in this ideal form, e.g., because the cameras are misaligned, a point in one image will be above or below the epipolar line. Accordingly, deviation from the epipolar line by at least a threshold amount can be indicative of misaligned cameras. The amount of deviation can be indicative of an amount of misalignment. As described, a first amount of misalignment can be determined before the device is powered off and a second amount of misalignment can be determined when the device is powered on, where a difference of misalignment more than a threshold amount can be indicative of an impact event while the device was powered off. Thereafter, one or more system checks can be performed, such as memory checks, hard-disk checks, antennas checks, etc.

In accordance with various embodiments, the system checks or other such processes can include at least one of checking the antenna system to verify that the antenna is properly receiving and sending signals, checking the communication system to verify that the device is capable of sending and receiving data, checking the memory components, such as the hard-disk and flash memory to verify that read/write operations and other operations are performing properly, checking the network systems to ensure that the device can connect to mobile and/or wireless networks, among other such system checks. It should be noted that the system checks described are examples, and are not to be taken as limiting. Other device components can be checked, as one skilled in the art would contemplate, such as microphones, cameras, display elements, power systems such as charging module and battery, lighting systems, position determining systems such as accelerometers, gyroscopes, proximity sensors, among other device components.

Figure 5:
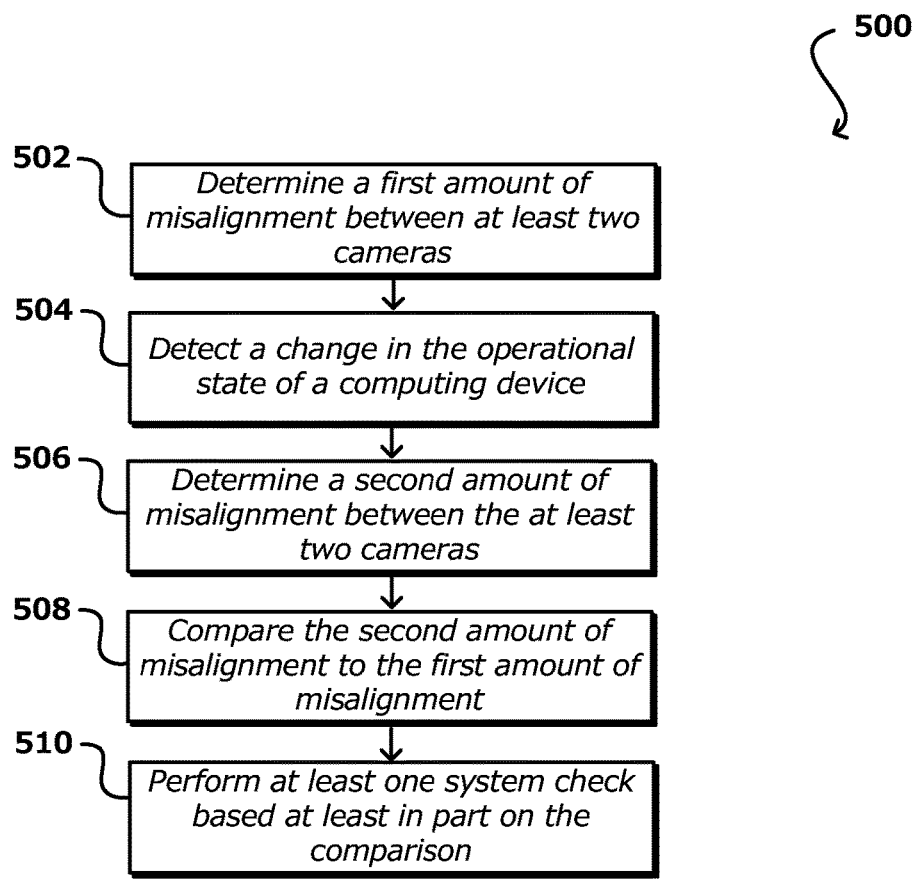
FIG. 5 illustrates an example computing process for determining an impact event in accordance with various embodiments.

FIG. 5 illustrates an example process 500 for determining an impact event when a computing device is powered off or otherwise in a standby mode. It should be understood that, for any process discussed herein, there can be additional, fewer, or alternative steps performed in similar or alternative orders, or in parallel, within the scope of the various embodiments unless otherwise stated. As described, approaches enable the use of various calibration processes to determine an amount of misalignment between two or more cameras of a computing device, where an amount of misalignment meeting or exceeding an allowable threshold can be indicative of an impact event that may have occurred when the device was powered off, in a low power state, or otherwise not able to detect such an impact. In this example, a first amount of misalignment between at least two cameras is determined 502. As described, the first amount of misalignment can be determined at a number of different times. For example, the first amount of misalignment can be determined when an image (e.g., a stereoscopic image) is captured, when the device resumes from a low power or powered off state, at the expiration of a predetermined interval of time, when a particular application is used, etc. The first amount of misalignment can be stored. In accordance with various embodiments, misalignment information can include lateral offset amounts for small angles, misalignments amounts in roll, pitch, and/or yaw for any or all of the cameras analyzed, among others.

In accordance with various embodiments, determining an amount of misalignment can include, for example, acquiring images using each camera for which misalignment information is to be determined. As discussed, this can include two or more pairs of cameras arranged in a pattern, such as a rectangle or regular array, such that different pairs of the cameras can be used to perform three-dimensional imaging, and the pairs can be selected in at least two different directions, which in at least some embodiments are orthogonal directions. Also, as discussed, in at least some embodiments all cameras of interest do not have to capture a respective image at substantially the same time, but at least pairs of cameras to be rectified should capture images at substantially the same time. In this example, each captured image can be analyzed to determine a set of feature points or other such aspects or portions of the image that can be located in the other images. As known for such purposes, feature points can be determined using algorithms such as feature detection algorithms (e.g., SIFT or SURF), corner finding algorithms, pattern matching algorithms, contour detection algorithms, and the like. For this example, the process uses a feature detection algorithm to locate specific points in each image. Corresponding feature points can then be located in each of the captured images, to the extent those feature points are represented in each of those images. Thus, a feature point corresponding to an object represented in an image captured by four cameras will have four pairs of coordinates, with an (x,y) or other such pair of coordinates representing the location of that feature point in each image. As discussed elsewhere herein, the examples utilize a single feature point for purposes of explanation, but it should be understood that multiple feature points will generally be analyzed and/or otherwise utilized in various analyses within the scope of the various embodiments.

Once the feature points are detected, coordinates of one or more of those feature points in each image can be determined. For purposes of explanation, each feature point in an image captured by camera #1 (C1 in the example of FIG. 2) will have representative coordinates of $(x_1, y_1)$, each corresponding feature point in an image captured by camera #2 (C2 in the example of FIG. 2) will have representative coordinates of $(x_2, y_2)$, etc. In the case where all the cameras are aligned, the feature points would have at least some similar values, such that for pitch and roll $y_1=y_2$ and $y_3=y_4$, and for yaw and roll $x_1=x_3$ and $x_2=x_4$. These values indicate that the stereo pairs (C1,C2), (C3,C4), (C1,C3), and (C2,C4) are rectified. If there is any misalignment, however, at least one of these rules will be violated.

An image descriptor can be determined for each interest point of at least a subset of the plurality of feature points in the first image and the second image, and a mapping between the plurality of feature points in the first image and the plurality of feature points in the second image can be determined by matching the image descriptors in the first image to corresponding image descriptors in the second image. Based at least in part on the mapping, an amount of offset can be determined in at least one axis, where the amount of offset can correspond to the first amount of misalignment.

Thereafter, a change in an operational state of the computing device is detected 504. In accordance with various embodiments, a change in an operational state can occur when the device resumes operation from a powered off state or resumes operation from a state where the computing device is otherwise unable to detect an impact event. As described, the cameras of the computing device can be caused to be misaligned due to impact with a surface (e.g., due to a drop). Accordingly, to determine whether the device impacted a surface when powered off, an amount of misalignment before and after the device is powered off can be determined. Accordingly, when the change in operational state is detected, a second amount of misalignment can be determined 506. The second amount of misalignment can be compared 508 to the first amount of misalignment, where a difference of misalignment more than a threshold amount can be indicative of an impact event while the device was powered off. Thereafter, one or more system checks can be performed 510 based at least in part on the comparison, such as memory checks, hard-disk checks, antennas checks, etc.

For at least some of these and other such processes, it can be desirable to perform the misalignment analysis over a large set of feature points, for a significant number of frames or images, in order to attempt to average out any noise issues. Further, the timing of the image capture, at least for pairs of cameras being analyzed, should be as close as possible in order to avoid motion- or time-based effects, which can negatively impact the results. In at least some embodiments, it can be desirable to implement a global shutter to attempt to coordinate the timing of the capturing of the various images to be analyzed. In some embodiments, a motion sensor, such as an inertial sensor or accelerometer, can be used to determine whether the device is moving, such that alignment adjustments are not performed when the device is moving and results might be impacted by the motion. Various other criteria or optimizations can be utilized with approaches discussed herein as well within the scope of the various embodiments.

Figure 6:
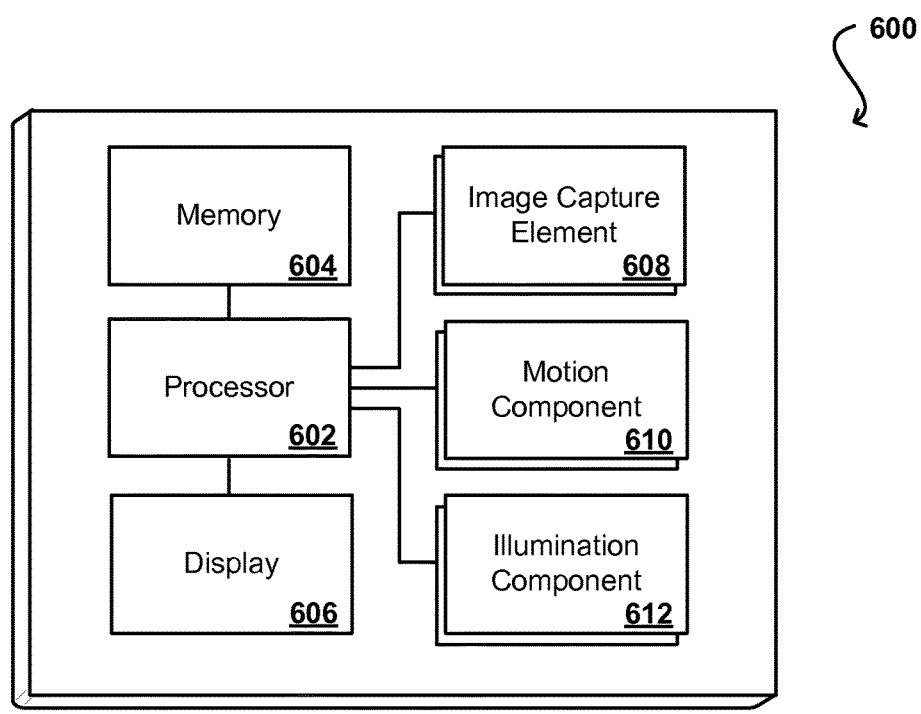
FIG. 6 illustrates an example configuration of components of a computing device such as that illustrated in FIG. 2.

In order to provide various functionality described herein, FIG. 6 illustrates an example set of basic components of a computing device 600, such as the device 200 described with respect to FIG. 2. In this example, the device includes at least one central processor 602 for executing instructions that can be stored in at least one memory device or element 604. As would be apparent to one of ordinary skill in the art, the device can include many types of memory, data storage or non-transitory computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 608, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 610, such as an electronic gyroscope used to determine motion of the device for assistance in input determination. The device also can include at least one illumination element 612, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 7:
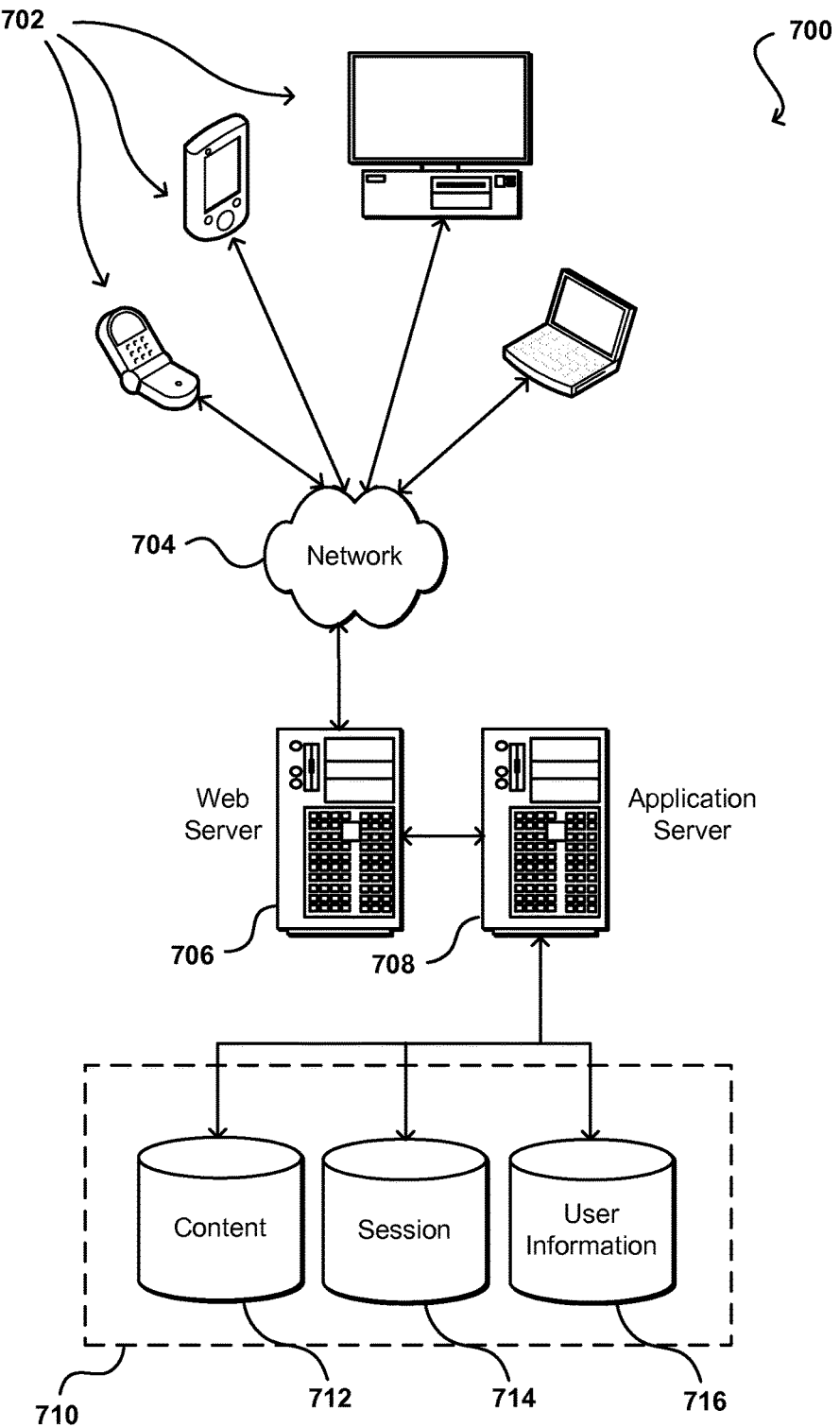
FIG. 7 illustrates an example environment in which various embodiments can be implemented.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, UDP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one computing device processor;
   a first camera having a first field of view;
   a second camera separated a distance on the computing device from the first camera, the second camera having a second field of view that at least partially overlaps the first field of view; and
   a memory device including instructions that, when executed by the at least one computing device processor, enables the computing device to:
      analyze at least a portion of a first image acquired by the first camera and a corresponding portion of a second image acquired by the second camera to determine a first amount of misalignment between the first camera and the second camera;
      determine, based on the computing device powering on, a second amount of misalignment between the first camera and the second camera;
      compare the second amount of misalignment to the first amount of misalignment;
      determine the second amount of misalignment differs from the first amount of misalignment by at least a threshold amount;
      determine the computing device impacted a surface or an object based on the second amount of misalignment differing from the first amount of misalignment by at least the threshold amount;
      perform at least one system test on the computing device based on the second amount of misalignment differing from the first amount of misalignment by at least the threshold amount, the at least one system test includes an operating status test of at least one of a memory component, an antenna, a hard-disk, a display element, or a communication component of the computing device; and
      display, by a display element of the computing device, a notification corresponding to the at least one system test.

2. The computing device of claim 1, wherein the instructions to determine at least one of the first amount of misalignment of the second amount of misalignment, when executed, further cause the computing device to:
   identify a plurality of feature points corresponding to a respective representation of the object represented in the first image;
   identify a plurality of feature points corresponding to a respective representation of the object represented in the second image;
   determine an image descriptor for each interest point of at least a subset of the plurality of feature points in the first image and the second image;
   determine a mapping between the plurality of feature points corresponding to the respective representation of the object represented in the first image and the plurality of feature points corresponding to a respective representation of the object represented in the second image by matching image descriptors determined in the respective representation of the object represented in the first image and image descriptors determined in the respective representation of the object represented in the second image; and
   determining an amount of offset of the first camera and the second camera along at least one axis based at least in part on the mapping.

3. The computing device of claim 1, wherein the instructions to determine at least one of the first amount of misalignment of the second amount of misalignment, when executed, further cause the computing device to:
   identify a plurality of feature points corresponding to a respective representation of the object represented in the first image;
   identify a plurality of feature points corresponding to a respective representation of the object represented in the second image;
   determine an image descriptor for each interest point of at least a subset of the plurality of feature points in the first image and the second image;
   determine a mapping between the plurality of feature points corresponding to the respective representation of the object represented in the first image and the plurality of feature points corresponding to a respective representation of the object represented in the second image by matching image descriptors determined in the respective representation of the object represented in the first image and image descriptors determined in the respective representation of the object represented in the second image; and determine misalignment parameters to correct for yaw, pitch, and roll misalignment between the first camera and the second camera based at least in part on the mapping.

4. A computer implemented method, comprising:
determining, by a computing device having a first camera and a second camera, a first amount of misalignment between the first camera and the second camera;
determining, based on a change in an operational state of a computing device, a second amount of misalignment between the first camera and the second camera;
comparing the second amount of misalignment to the first amount of misalignment;
determining the second amount of misalignment differs from the first amount of misalignment by at least a threshold amount;
determining the computing device impacted a surface or an object based on the threshold amount;
performing at least one system test on the computing device based on the second amount of misalignment differing from the first amount of misalignment by at least the threshold amount, the at least one system test includes an operating status test of at least one of a memory component, an antenna, a hard-disk, a display element, or a communication component of the computing device; and
displaying, by a display element of the computing device, a notification of the operating status test.

5. The computer implemented method of claim 4, wherein determining one of the first amount of misalignment or the second amount of misalignment includes:
acquiring a first image of an object by the first camera of a computing device;
acquiring a second image of the object by the second camera of the computing device;
identifying a plurality of feature points corresponding to the object represented in the first image and the second image;
determining an image descriptor for each interest point of at least a subset of the plurality of feature points in the first image and the second image;
determining a mapping between the plurality of feature points in the first image and the plurality of feature points in the second image by matching the image descriptors in the first image to corresponding image descriptors in the second image; and
determining an amount of offset of the first camera and the second camera along at least one axis based at least in part on the mapping.

6. The computer implemented method of claim 4, wherein the computing device includes at least four cameras, wherein determining one of the first amount of misalignment or the second amount of misalignment includes:
acquiring an image by each of the four cameras of the computing device, the first camera being aligned along a first axis with the second camera, and a third camera being aligned along a second axis with a fourth camera, the first axis being orthogonal to the second axis;
identifying, for at least two pairs of the at least four cameras, a plurality of feature points corresponding to an object represented in each of the respective images acquired by the at least two pairs of the at least four cameras;
determining an image descriptor for each interest point of at least a subset of the plurality of feature points in each of the respective images;
determining a mapping between the plurality of feature points in each of the respective images by matching corresponding image descriptors in each of the respective images; and
determining an amount of misalignment of at least one camera of the at least four cameras in at least one of three dimensions based at least in part on the mapping.

7. The computer implemented method of claim 6, wherein determining the amount of misalignment of the at least one camera further includes:
determining an amount of offset of at least the first camera and the second camera along the first axis based at least in part on the mapping between at a feature point in a first image captured by the first camera and a corresponding feature point in a second image captured by the second camera.

8. The computer implemented method of claim 5, wherein determining one of the first amount of misalignment or the second amount of misalignment includes:
acquiring a first image of an object by the first camera of a computing device;
acquiring a second image of the object by the second camera of the computing device;
identifying a plurality of feature points corresponding to the object represented in the first image and the second image;
determining an image descriptor for each interest point of at least a subset of the plurality of feature points in the first image and the second image;
determining that an image descriptor in the first image is offset from a corresponding image descriptor in the second image.

9. The computer implemented method of claim 6, wherein the at least four cameras acquire a respective image at substantially a same time.

10. The computer implemented method of claim 6, wherein the three dimensions include roll, pitch, and yaw.

11. The computer implemented method of claim 6, further comprising:
determining each of the plurality of feature points using at least one feature detection algorithm, the at least one feature detection algorithm being selected from at least one of a Moravec corner detection algorithm, a Harris corner detection algorithm, a FAST corner detection algorithm a scale-invariant feature transform (SIFT) algorithm, a speeded up robust feature (SURF) algorithm, a gradient location and orientation histogram algorithm, a rotation-invariant feature transform (RIFT) algorithm, a Canny algorithm, or a local texture descriptor algorithm.

12. The computer implemented method of claim 4, wherein the change in the operational state of the computing device corresponds to at least one of the computing device resuming operation from a powered off state or the computing device resuming operation from a standby state.

13. The computer implemented method of claim 4, further comprising:
determining the first amount of misalignment based on at least one of an image captured by the first camera and the second camera, an expiration of a predetermined interval of time, a user request, or the computing device executing a particular application; and
determining the second amount of misalignment value at least when the computing device is powered on or when the computing device resumes from a standby mode.

14. A non-transitory computer readable storage medium storing one or more sequences of instructions executable by one or more processors of a computing device, the instructions, when executed, cause the computing device to perform a set of operations comprising:

determining, by the computing device, a first amount of misalignment between a first camera of the computing device and a second camera of the computing device;

determining a second amount of misalignment between the first camera and the second camera based on a change in an operational state of a computing device;

comparing the second amount of misalignment to the first amount of misalignment;

determining the second amount of misalignment differs from the first amount of misalignment by at least a threshold amount;

determining the computing device impacted a surface or an object based on the threshold amount;

performing at least one system test on the computing device based on the second amount of misalignment differing from the first amount of misalignment by at least the threshold amount, the at least one system test includes an operating status test of at least one of a memory component, an antenna, a hard-disk, a display element, or a communication component of the computing device; and displaying, by a display element of the computing device, a notification of the operating status test.

15. The non-transitory computer readable storage medium of claim 14, wherein the computing device includes at least four cameras, wherein the instructions for determining one of the first an amount of misalignment or the second amount of misalignment, when executed, further cause the computing device to:

acquiring an image by each of the four cameras of the computing device, the first camera being aligned along a first axis with the second camera, and a third camera being aligned along a second axis with a fourth camera, the first axis being orthogonal to the second axis;

identifying, for at least two pairs of the at least four cameras, a plurality of feature points corresponding to an object represented in each of the respective images acquired by the at least two pairs of the at least four cameras;

determining an image descriptor for each interest point of at least a subset of the plurality of feature points in each of the respective images;

determining a mapping between the plurality of feature points in each of the respective images by matching corresponding image descriptors in each of the respective images; and determining an amount of misalignment of at least one camera of the at least four cameras in at least one of three dimensions based at least in part on the mapping.

16. The non-transitory computer readable storage medium of claim 15, wherein the instructions for determining one of the first an amount of misalignment or the second amount of misalignment, when executed, further cause the computing device to perform the operations of:

acquiring a first image of an object by the first camera of a computing device;

acquiring a second image of the object by the second camera of the computing device;

identifying a plurality of feature points corresponding to the object represented in the first image and the second image;

determining an image descriptor for each interest point of at least a subset of the plurality of feature points in the first image and the second image;

determining a mapping between the plurality of feature points in the first image and the plurality of feature points in the second image by matching the image descriptors in the first image to corresponding image descriptors in the second image; and determining an amount of offset of the first camera and the second camera along at least one axis based at least in part on the mapping.

17. The non-transitory computer readable storage medium of claim 15, wherein the instructions, when executed, further cause the computing device to perform the operations of:

acquiring a first image of an object by the first camera of a computing device;

acquiring a second image of the object by the second camera of the computing device;

identifying a plurality of feature points corresponding to the object represented in the first image and the second image;

determining an image descriptor for each interest point of at least a subset of the plurality of feature points in the first image and the second image; and determining that an image descriptor in the first image is offset from a corresponding image descriptor in the second image in at least two dimensions.

\* \* \* \* \*